(12) United States Patent
Karlsson et al.

(10) Patent No.: US 9,629,173 B2
(45) Date of Patent: Apr. 18, 2017

(54) METHOD AND ARRANGEMENT FOR HANDLING RADIO RESOURCES

(71) Applicant: Telefonaktiebolaget L M Ericsson (publ), Stockholm (SE)

(72) Inventors: Josefin Karlsson, Torslanda (SE); Magnus Hurd, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 14/407,029

(22) PCT Filed: Jun. 19, 2014

(86) PCT No.: PCT/SE2014/050760
§ 371 (c)(1),
(2) Date: Dec. 10, 2014

(87) PCT Pub. No.: WO2015/195014
PCT Pub. Date: Dec. 23, 2015

(65) Prior Publication Data
US 2016/0219605 A1    Jul. 28, 2016

(51) Int. Cl.
*H04W 72/10* (2009.01)
*H04W 72/06* (2009.01)
(Continued)

(52) U.S. Cl.
CPC ........... *H04W 72/10* (2013.01); *H04W 72/06* (2013.01); *H04W 76/022* (2013.01); *H04W 76/041* (2013.01)

(58) Field of Classification Search
CPC ... H04W 72/10; H04W 72/06; H04W 76/022; H04W 76/041
See application file for complete search history.

(56) References Cited

U.S. PATENT DOCUMENTS

2011/0103310 A1\* 5/2011 Stojanovski ............ H04L 12/66
370/328
2012/0202491 A1\* 8/2012 Fox ...................... H04B 7/2609
455/435.1
(Continued)

FOREIGN PATENT DOCUMENTS

EP          2 197 222 A1    6/2010
KR    10-2014-0041305         4/2014
                (A)
(Continued)

OTHER PUBLICATIONS

3GPP TS 23.401 V12.2.0, 3rd Generation Partnership Project; Technical Specification Group Services and System Aspects; General Packet Radio Service (GPRS) enhancements for Evolved Universal Terrestrial Radio Access Network (E-UTRAN) access (Release 12 ). Sep. 2013.\*

(Continued)

*Primary Examiner* — Paul H Masur
*Assistant Examiner* — Kabir Jahangir
(74) *Attorney, Agent, or Firm* — Myers Bigel, P.A.

(57) ABSTRACT

Herein are described a number of network nodes and methods therein for handling radio resources. The method to be performed by a base station, BS, comprises receiving an Initial Context Setup message from an MME as part of a Service Request procedure, where the Initial Context Setup message comprises information indicating which at least one EPS bearer, out of a number of EPS bearers associated with a UE, that has triggered initiation of the Service Request procedure. The method further comprises deciding whether or not to allocate radio resources for the requested service based on a priority value associated with the at least one indicated EPS bearer; and allocating radio resources for the requested service in accordance with the decision.

14 Claims, 10 Drawing Sheets

(51) Int. Cl.
*H04W 76/02* (2009.01)
*H04W 76/04* (2009.01)

(56) References Cited

U.S. PATENT DOCUMENTS

| | | | | |
|---|---|---|---|---|
| 2012/0282956 | A1* | 11/2012 | Kim | H04L 12/5895 455/466 |
| 2013/0115957 | A1* | 5/2013 | Nishida | H04W 76/026 455/437 |
| 2013/0301611 | A1* | 11/2013 | Baghel | H04W 72/04 370/331 |
| 2014/0016614 | A1* | 1/2014 | Velev | H04W 4/005 370/331 |
| 2014/0219248 | A1* | 8/2014 | Reddiboyana | H04W 76/025 370/331 |

FOREIGN PATENT DOCUMENTS

| WO | WO 2013/009892 A1 | 1/2013 |
|---|---|---|
| WO | WO 2013/066350 A1 | 5/2013 |

OTHER PUBLICATIONS

3GPP, Technical Specification, "3rd Generation Partnership Project; Technical Specification Group Services and System Aspects; General Packet Radio Service (GPRS); Service description; Stage 2 (Release 12)", 3GPP TS 23.060 V12.3.0 (Dec. 2013), 344 pp.

3GPP, Technical Specification, "3rd Generation Partnership Project; Technical Specification Group Services and System Aspects; Policy and charging control architecture (Release 12)", 3GPP TS 23.203 V12.3.0 (Dec. 2013), 215 pp.

3GPP, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.3.0 (Dec. 2013), 302 pp.

3GPP, Technical Specification, "3rd Generation Partnership Project; Technical Specification Group Services and System Aspects; Architecture enhancements for non-3GPP accesses (Release 12)", 3GPP TS 23.402 V12.3.0 (Dec. 2013), 288 pp.

3GPP, Technical Specification, "3rd Generation Partnership Project; Technical Specification Group Core Network and Terminals; Mobile radio interface Layer 3 specification; Core network protocols; Stage 3 (Release 12)", 3GPP TS 24.008 V12.4.0 (Dec. 2013), 685 pp.

3GPP, Technical Specification, "3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.3.0 (Dec. 2013), 353 pp.

3GPP, Technical Specification, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.3.0 (Dec. 2013), 236 pp.

3GPP, Technical Specification, "3rd Generation Partnership Project; Technical Specification Group Radio Access Network (E-UTRA) and Evolved Universal Terrestrial Radio Access Network (E-UTRAN); Overall description; Stage 2 (Release 11)", 3GPP TS 36.300 V11.7.0 (Sep. 2013), 209 pp.

3GPP, Technical Specification, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.5.0 (Sep. 2013), 34 pp.

3GPP, Technical Specification, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.0.0 (Dec. 2013), 278 pp.

International Search Report, International Application No. PCT/SE2014/050760, Nov. 3, 2014.

3GPP, Technical Specification—3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.4.0 (Mar. 2014), 302 pp.

Telcordia et al., "On the Use of ARP and EBI for Downlink Data Notification", Document for: Discussion, Agenda Item: 8.3, Work Item/Release: eMPS/Release 10, TD S2-105515, 3GPP TSG SA WG2 Meeting #82, Jacksonville, Florida, Nov. 15-19, 2010, 2 pp. (XP050522900).

\* cited by examiner

METHOD AND ARRANGEMENT FOR HANDLING RADIO RESOURCES

CROSS REFERENCE TO RELATED APPLICATION

This application is a 35 U.S.C. §371 national stage application of PCT International Application No. PCT/SE2014/050760, filed on 19 Jun. 2014, the disclosure and content of which is incorporated by reference herein in its entirety.

TECHNICAL FIELD

The solution described herein relates generally to handling of radio resources in a wireless communication network, and in particular to an improved service request procedure in Long Term Evolution, LTE, networks.

BACKGROUND

In wireless networks like LTE, a User Equipment, UE, obtains access to a network as a result from the cooperation of several network nodes. Such an access means that a certain amount of resources will be used in the network nodes by the UE for the duration of the intended service. Granting service of too many UEs would mean that network nodes exhaust their resources to the point that none of the connected UEs can be served at a satisfactory level.

At some point it may therefore be necessary to reject service requests from UEs seeking access to the network. The functionality to determine whether to grant or reject a request for service is often referred to as Admission Control.

For base stations, such as eNBs in LTE networks, there are two aspects of prioritization to consider at congestion: (i) packet-level prioritization as represented by Quality of Service Identifier, QCI; and (ii) bearer-level prioritization executed at bearer-level establishment/modification and preemption, as represented by Allocation and Retention Priority, ARP. Admission control at bearer level provides a higher level of accessibility for bearers, such as Evolved Packet System, EPS, bearers, associated with more prioritized ARP.

FIG. 1a schematically illustrates nodes in an LTE-type communication network. A UE 101 is located in a cell 103 served by an eNB 102. The eNB is connected to a Mobility Management Entity, MME 104. The MME is connected to a Serving GateWay, SGW or S-GW, which is connected to a Packet Data Network GateWay PGW or P-GW.

FIG. 1b illustrates the concept of bearers in LTE-type communication systems. To achieve an End-to-End service, e.g. transfer of data, between a wireless terminal and a peer entity, a number of different so-called bearers are involved. EPS bearers, which have already been mentioned, extend from a wireless terminal, a UE, to a Packet Data Network Gateway, P-GW. EPS bearers are composed of Evolved-Radio Access Bearers, E-RABs, and S5/S8 bearers, where "S5/S8" refers to an interface between the S-GW and P-GW. An E-RAB, in its turn, is composed of a radio bearer and an S1 bearer, where S1 denotes an interface. Herein, the focus is on allocation of radio resources and the set-up of E-RABs for EPS bearers. When referring to radio resources and bearers herein, the terms "E-RAB" and "radio bearer" may be used interchangeably, even though it is not exactly the same thing, as can be seen e.g. in FIG. 1b. The MME is not shown in FIG. 1b, but is, in an LTE network, typically located between eNB and S-GW. From the P-GW to a Peer entity, data associated with a service is sent over an external bearer.

Before starting a service, the bearers necessary to carry out the service need to be set up. The setup of these bearers is accomplished in a so-called Service Request procedure. A Service Request procedure can be initiated either by a UE or by the network, which will be further described below.

UE Initiated Service Request

For LTE, the procedure for a UE triggered service request is done in several steps, which will be described below with reference to FIG. 2, and, in more detail, further below:

The UE performs an RRC connection establishment procedure, if in state Idle (not shown in FIG. 2).

The UE sends a Non-Access Stratum, NAS, message "(Extended) Service Request" to the MME, indicated as message "1." and "2." in FIG. 2.

The MME requests eNB to establish the E-RABs for the EPS bearers by means of an Initial Context Setup message, indicated as message "4." in FIG. 2.

Network Initiated Service Request

For LTE, a network-initiated service request procedure involves UE, eNB, MME and the SGW. The procedure is performed in several steps, which will be described below with reference to FIG. 3 and in more detail further below:

A Downlink Data Notification message is sent from the SGW to the MME advertising there is data on some EPS Bearers. The Data notification message is indicated as "2a." in FIG. 3.

The MME pages the UE, indicated as messages "3a" and "4a" in FIG. 3.

The UE responds to the paging and performs the steps indicated for UE triggered Service Request, i.e. the procedure described above with reference to FIG. 2. The box indicated with "5" in FIG. 3 thus represents a service request procedure as the one illustrated in FIG. 2.

In the Initial Context Setup message, "5." in FIG. 2, the MME indicates ARP for each E-RAB. The ARP information may then be used by the eNB to perform admission control, e.g. deciding whether or not to allocate radio resources for the requested service for the UE in question. However, the inventors have realized that there are problems associated with achieving an adequate admission control on bearer level, and thus with achieving adequate handling of radio resources, which will be further described below.

SUMMARY

It would be desirable to improve handling of radio resources in wireless communication networks.

Herein, a problem is discussed, and a solution is proposed, according to which an eNB is provided with information, in a Service request procedure, about not only the priority of the requested E-RABs, but also about which EPS bearer or bearers that triggered the Service request. The Service request may be network initiated or UE initiated. The one or more EPS bearers initiating or triggering the service request are expected to accommodate an ongoing data transfer at the point of admission; EPS bearers not triggering the request are not expected to accommodate any ongoing data transfer at the point of admission.

According to a first aspect, a method is provided, to be performed by a base station, BS, operable in a wireless communication system. The method comprises receiving an Initial Context Setup message from an MME as part of a Service Request procedure, where the Initial Context Setup message comprises information indicating which at least one EPS bearer, out of a number of EPS bearers associated with a UE, that has triggered initiation of the Service Request procedure. The method further comprises deciding whether or not to allocate radio resources for the requested service based on a priority value associated with the at least one indicated EPS bearer; and allocating radio resources for the requested service in accordance with the decision.

According to a second aspect, a method is provided to be performed by an MME, operable in a wireless communication system. The method comprises, as part of a Service Request procedure, indicating, in an Initial Context Setup Request towards a BS, which at least one EPS bearer, out of a number of EPS bearers associated with a UE, that triggered initiation of the Service Request procedure.

According to a third aspect, a method is provided to be performed by a UE, operable in a wireless communication system. The method comprises, as part of a UE initiated Service Request procedure, indicating, in a Service Request message towards an MME, which at least one EPS bearer, out of a number of EPS bearers associated with the UE, that triggered initiation of the Service Request procedure.

According to a fourth aspect, a method is provided to be performed by an SGW, operable in a wireless communication system. The method comprises, as part of a network initiated Service Request procedure, indicating to an MME, in a Downlink Data Notification message, which at least one EPS bearer, out of a number of EPS bearers associated with a UE, that triggered initiation of the Service Request procedure.

According to a fifth aspect, a BS is provided, which is operable in a wireless communication network. The BS is configured to receive, from an MME, an Initial Context Setup message, as part of a Service Request procedure, where the Initial Context Setup message comprises information indicating which at least one EPS bearer, out of a number of EPS bearers associated with a UE, that has triggered initiation of the Service Request procedure. The BS is further configured to decide whether or not to allocate radio resources for the requested service based on a priority value associated with the at least one indicated EPS bearer; and to allocate radio resources for the requested service in accordance with the decision.

According to a sixth aspect, an MME is provided, which is operable in a wireless communication system. The MME is configured to, as part of a Service Request procedure, indicate, in an Initial Context Setup Request towards a BS, which at least one EPS bearer, out of a number of EPS bearers associated with a UE, that triggered initiation of the Service Request procedure.

According to a seventh aspect, a UE is provided, which is operable in a wireless communication system. The UE is configured to indicate, in a Service Request message towards an MME, which at least one EPS bearer, out of a number of EPS bearers associated with the UE, that triggered initiation of the Service Request procedure.

According to an eighth aspect, an SGW is provided, which is operable in a wireless communication system. The SGW is configured to, as part of a network initiated Service Request procedure, indicate to an MME, in a Downlink Data Notification message, which at least one EPS bearer, out of a number of EPS bearers associated with a UE, that triggered initiation of the Service Request procedure.

One advantage with the proposed methods and arrangements is that an MME can continue, as before, to request resources for all known EPS bearers associated with the UE in a Service Request procedure, while, at the same time, an eNB is enabled to prioritize the access of service requests according to the intended service without having to e.g. monitor the bearers for activity. The BS is enabled to decide whether or not to allocate radio resources for a requested service based on a priority or priority value associated with the at least one indicated EPS bearer.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1A:
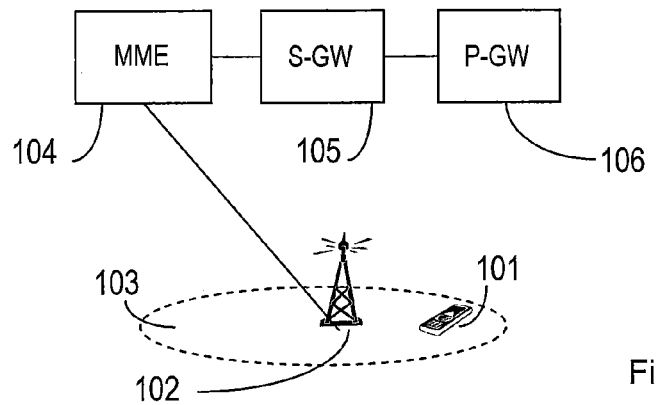
FIG. 1a illustrates nodes in a communication network.
Figure 1B:
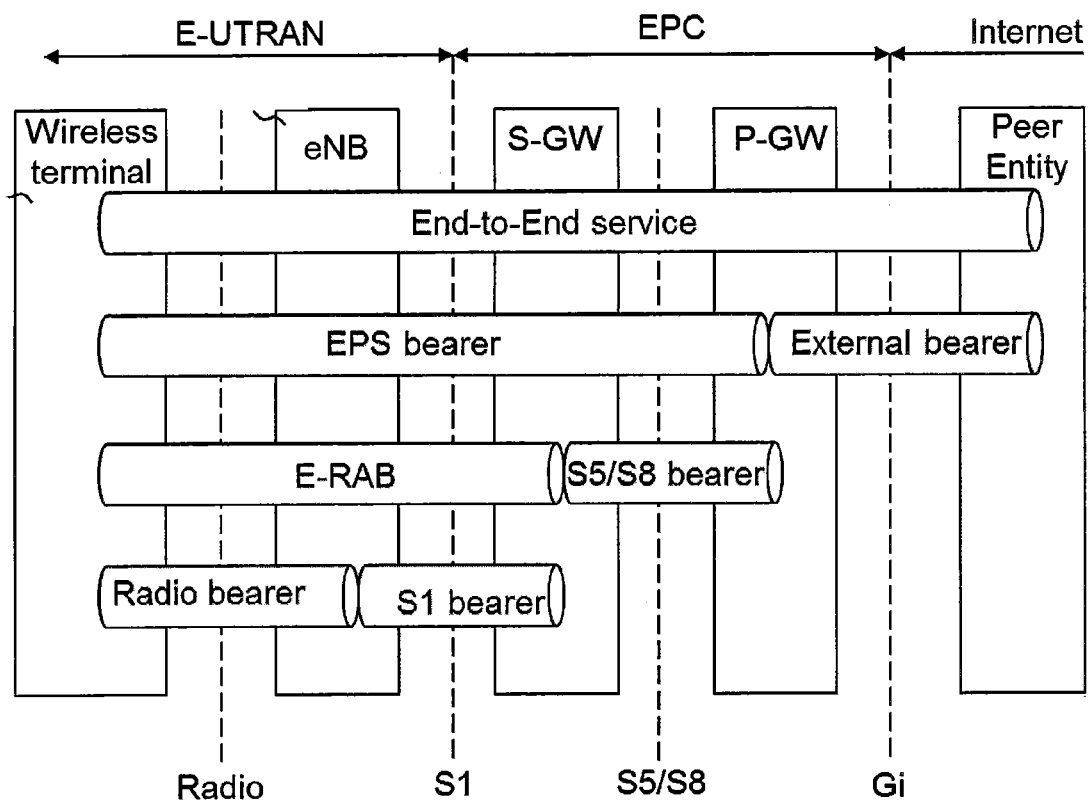
FIG. 1b illustrates the concept of bearers for providing services in a communication network

As mentioned in the background section, the inventors have realized that there are certain problems associated with achieving an adequate Admission Control on bearer level for UEs in a congested network. Typically, the MME requests radio resources, E-RABs, for all EPS bearers it is aware of for a UE. If the UE is associated with two EPS bearers, the MME will request E-RABs for both these EPS bearers. This can be seen as that the MME pre-allocates the radio resources for the EPS bearers in eNB. The ARP for each EPS bearer is indicated in an Initial Context Setup message from the MME to the eNB. The ARP value for an EPS bearer will be valid for a requested E-RAB, associated with the EPS bearer.

That is, the MME will not only request radio resources for the EPS bearers which actually have data or control information to be transmitted, but also for EPS bearers which do not have any data or control information to transmit, i.e all previously established EPS bearers will be requested to be re-established by the MME to the eNB This means that the eNB will make Admission Control decisions based on ARPs associated with the transmitting EPS bearers as well as the non-transmitting ones. Consequently, as realized by the inventors, an adequate differentiation or Admission Control based on the ARP value of an EPS bearer actually initiating or triggering the service request may not be done, since the eNB cannot determine which EPS bearer that triggered the service request. This could also be described as that the ARP values presented to the eNB by the MME do not reflect the intention of the service request.

There are several resources managed by eNB that may be congested. Using ARP, an eNB can prioritize between Service requests such that requests associated with a high priority ARP are more likely to get access to the resources at congestion. As a simple example to illustrate a problem realized by the inventors, consider a network where some UEs have an IMS (IP Multimedia Subsystem) subscription and some have not. In this example, a UE with an IMS subscription typically has two default bearers established, one for the Internet and another one for IMS; while a UE without an IMS subscription only has the internet default bearer. When an eNB is requested to allocate radio resources in a Service Request, the MME asks for radio resources for all of the EPS bearers. Assuming different priority, as described by ARP, for the IMS default bearer and the internet default bearer, the eNB would only be able to differentiate between UEs with an IMS subscription versus those UEs without an IMS subscription. Assuming that an IMS default bearer has a higher priority than an Internet default bearer, a UE having an IMS default bearer would be evaluated for admission control based on the ARP associated with the IMS default bearer, even though it was the Internet default bearer that triggered the request, e.g. having data to be transmitted. During congestion, a UE having an IMS default bearer would then "always" be prioritized over a UE only having an Internet default bearer, irrespective of which of the bearers that triggered the service request. The reason for this prioritization is that eNB needs to assume the worst case.

The inventors have realized that, to solve this problem, the eNB may be provided with information about which one or more EPS bearers, of a number of EPS bearers for which radio resources have been requested, that have an immediate need for resources, e.g. having data waiting to be transmitted. This could be done in the Initial Context Setup message. In case downlink data packets or control signaling for an EPS bearer arrives at the SGW, this situation could be explicitly indicated in the Downlink Data Notification message from the SGW to the MME (2a in FIG. 3). In case a UE has data packets or control signaling to be sent in the uplink direction, the EPS bearer on which this uplink information is to be sent could be explicitly indicated in the Service Request message from the UE towards the MME (1 in FIG. 2).

By use of the suggested solution, the MME can continue, as before, to request resources for all known EPS bearers for the UE, while, at the same time, the eNB is enabled to prioritize the access according to the intended service without having to monitor the bearers for activity. This then resolves the prioritization between e.g. two users having several default bearers, one for IMS and one for Internet, such that a user with a service request associated with pending data on the IMS default bearer will get more prioritized in admission control compared to a UE with pending data on the Internet default bearer only. Note that this can take place without any knowledge in eNB about the IMS or Internet APN; it is only ARP of the EPS bearers for which there is an indication of pending data that matters.

In order to explain another advantage or the solution presented herein it needs to be explained that for some types of resources, there is no cost related to the EPS bearers unless there really is data transferred. For example, this is the case for air interface resources like Physical Downlink Control Channel (PDCCH) and Physical Downlink Shared Channel/Physical Uplink Shared Channel (PDSCH/PUSCH). This kind of resources will be referred to as "type A" resources. On the other hand, for administrative resources related to e.g. storage of bearer context, the cost is independent on whether there is an ongoing data transfer or not. This kind of resources will be referred to as "type B" resources. The aspect of pre-allocating EPS bearers mentioned above relates to type B resources.

Use of the solution proposed herein opens a field of possibilities. For example, when performing admission control for set-up of E-RABs, an eNB can evaluate, using the ARP of the EPS bearer/E-RAB, both type A and type B resources for the EPS bearers triggering the service request, whereas it may restrict the evaluation to only type B resources, using the ARP of the EPS bearer/E-RAB, for EPS bearers not triggering the service request. It is also possible to completely disregard from the ARP assigned to an EPS bearer that is not triggering the service request. This strategy can be advantageous for resources that count per UE with a priority that, today, is based on all the EPS bearers/E-RABs of the UE, e.g. by the ARP priority level of the most prioritized EPS bearer/E-RAB, as previously described e.g. in the example with IMS and Internet bearers.

Another policy could be to admit or reject all the bearers indicated in Initial Context Setup based on the ARP of the bearer(s) triggering the service request, e.g. the most prioritized ARP of the bearers triggering the service request. Since the UE is released if all its bearers fail to establish, this effectively turns into ARP-differentiated UE admission control. In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Embodiments of Methods

Embodiments of a method will first be described as seen from a perspective of an eNB or BS 102, then embodiments of the method will be described seen from a perspective of the MME or core network node 104; then from a perspective of the UE or wireless device 101, and then from a perspective of the SGW 105.

Method for Base Station, BS

Figure 4:
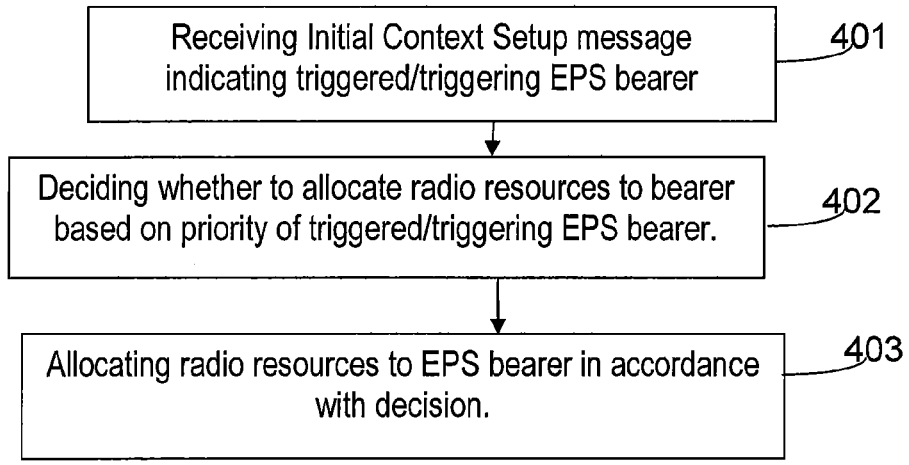
FIG. 4 illustrates a procedure in a base station BS, according to an exemplifying embodiment.

Example of embodiments of a method performed by a BS 102, for handling radio resources, will now be described with reference to a flowchart depicted in FIG. 4. The method comprises the following actions, which actions may be taken in any suitable order.

Action 401 receiving, from an MME, an Initial Context Setup message as part of a Service Request procedure, said Initial Context Setup message comprising information indicating which at least one EPS bearer, out of a number of EPS bearers associated with a UE, that has triggered initiation of the Service Request procedure.

As previously mentioned, a Service Request procedure is a signaling procedure which may be initiated by a UE or by "the network", where the network is represented e.g. by an SGW. In either case, the BS will receive the Initial Context Setup message, which may be seen when studying e.g. FIGS. 2 and 3 herein. A Service Request is a request for allocation of the resources needed to perform a certain service. By an Initial Context Setup message, an MME requests radio resources for all EPS bearers associated with a UE, that are known to the MME. Before, the Context Setup message would not specify which EPS bearer or bearers that triggered initiation of the Service Request procedure, but only equally indicate all EPS bearers known to be associated with the UE in question for the requested service. By indicating which at least one EPS bearer that triggered the initiation, this EPS bearer or bearers could be singled out from the total number or the set of EPS bearers that is associated with the UE in question. Thereby, the priority or priority value associated with this at least one EPS bearer can be used for evaluating the service request against other service requests.

That an EPS bearer is "triggering initiation of the Service Request procedure" refers to that the EPS bearer is the cause of that a Service request procedure is triggered, e.g. that there is data for transmission on the EPS bearer. That is, something in association with this EPS bearer, e.g. data to be transmitted, caused or triggered the start of a Service Request procedure. Such an EPS bearer could be referred to as a "triggered EPS bearer" or a "triggering EPS bearer". The indication of the at least one triggered EPS bearer in the Context Setup message may be explicit in form of a flag or bitmap that is set e.g. to "1" for the one or more EPS bearers. Alternatively, the indication could be implicit or semi-implicit, e.g. in form of an order or location of the EPS bearers identified in the Context Setup message.

Action 402 deciding whether or not to allocate radio resources for the requested service based on a priority value associated with the at least one indicated EPS bearer;

The BS is responsible for admitting or rejecting allocation of the requested or needed resources. As long as there are more resources than needed, this is not a very difficult task, but in situations such as congestion, the BS will need to prioritize between requests. As previously described, each EPS bearer is associated with a priority value, an ARP, which indicates the level of importance of the EPS bearer, or rather of the information sent over the EPS bearer. For example, an EPS bearer of great importance, i.e. high priority, may be associated with a low ARP value, e.g. 1; while an EPS bearer of moderate importance or priority may be associated with a higher ARP value, e.g. 5, than the EPS bearer of high priority. The ARP values of the EPS bearers are provided to the BS by the MME, typically in the Context Setup message. For example, the deciding may be based on the priority value indicating the highest priority of the priority values associated with the at least one indicated EPS bearer.

Action 403 allocating radio resources for the requested service in accordance with the decision.

After deciding whether or not to allocate resources for a requested service, i.e. to admit or reject the request, the BS takes action in accordance with the decision. That is, when the decision is to admit the request, the resources are allocated by the BS, the E-RABs are set up, and the service may be carried out. And, for example, when the decision is to reject the request, no resources are allocated, and thus the service may not be carried out. Consequently, the action 403 may be refraining from allocating radio resources for the requested service.

EPS bearers may have a priority, e.g. expressed by means of ARP, which is based on an APN, Access Point Name associated with the EPS bearer. The APN refers to a PDN, Packed Data Network, with which the EPS bearer connects a UE, i.e. with which the UE communicates over the EPS bearer. The PDN could be e.g. IMS supporting VoLTE, or Internet, as previously described. This could be expressed as that the APN points to the PDN associated with an EPS bearer.

Method for Mobility Management Entity, MME

Figure 5:
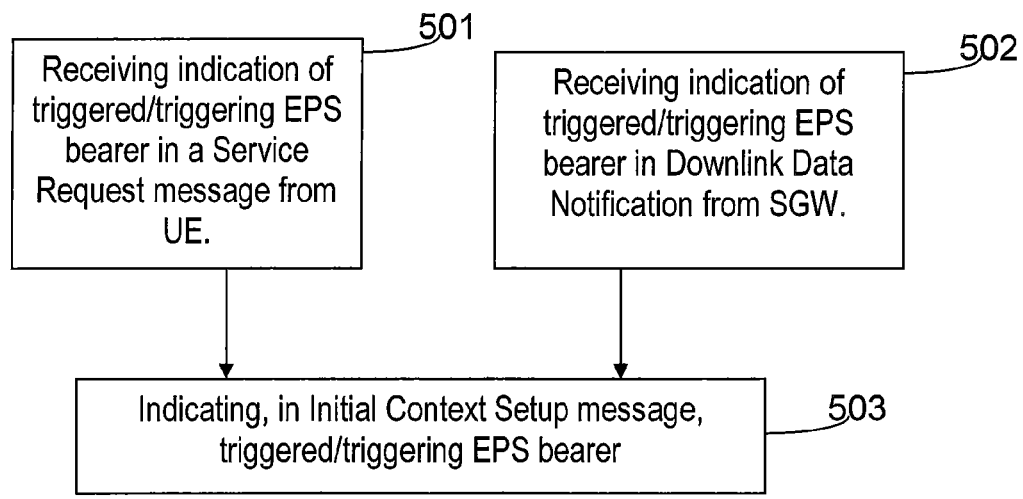
FIG. 5 illustrates a procedure in an MME, according to an exemplifying embodiment.

Embodiments of the method will now be described seen from a perspective of the MME 104. Thus, examples of embodiments of a method performed by an MME 104 for assisting a BS 102 to handle radio resources will now be described with reference to a flowchart depicted in FIG. 5. The method comprises the following actions, where actions 501 and 502 are interchangeable depending on whether the Service Request procedure is initiated by a UE or by the network, e.g. SGW.

Action 501 receiving, from a UE, a Service Request message indicating which at least one EPS bearer, out of a number of EPS bearers associated with the UE, that triggered initiation of the Service Request procedure, thus enabling the indicating of this information in the Initial Context Setup Request towards the BS.

Action 501 is performed when a Service Request procedure is UE initiated, but not when the Service Request procedure is network initiated. As before, it is assumed that all EPS bearers known, by the MME, to be associated with the UE are indicated in the Initial Context Setup Request towards the BS. This assumption is valid whenever Initial Context Setup Request is mentioned herein. However, in the solution suggested herein, it is further indicated which one or more out of these indicated EPS bearers that triggered the Service Request procedure, as previously mentioned.

Action 502 receiving, from an SGW, a Downlink Data Notification message, indicating which at least one EPS bearer, out of a number of EPS bearers associated with a UE, that triggered initiation of the Service Request procedure, thus enabling the indicating of this information in the Initial Context Setup Request towards the BS.

Action 502 is performed when a Service Request is network initiated, but not when the Service Request is UE initiated.

Action 503 indicating, in an Initial Context Setup Request towards a BS, which at least one EPS bearer, out of a number of EPS bearers associated with a UE, that triggered initiation of the Service Request procedure, thus enabling the BS to decide whether or not to allocate radio resources, for the requested service, based on a priority value associated with the at least one indicated EPS bearer.

Action 503 is performed as a part of a Service Request procedure, which may be either UE initiated or network initiated. The indication may be or comprise a flag or a bitmap; and the Initial Context Setup Request is assumed to indicate the EPS bearers associated with the UE, as previously described. The priority value is primarily thought to be derived from the ARP, but it could alternatively be some other, differently denoted, representation of priority.

Method for a User Equipment, UE

Figure 6:
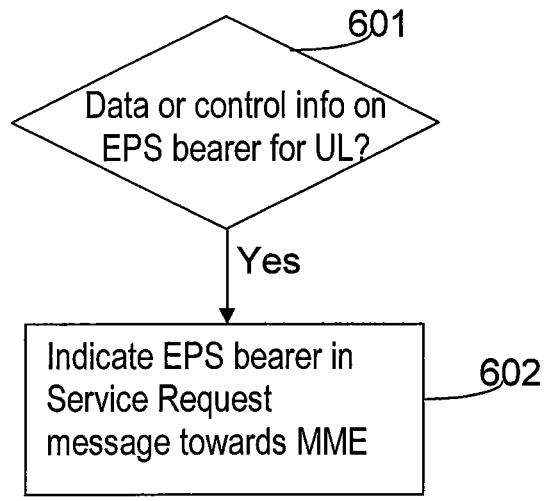
FIG. 6 illustrates a procedure in a UE, according to an exemplifying embodiment.

Embodiments of the method will now be described as seen from a perspective of a UE 101. Examples of embodiments of a method performed by a UE 101 for assisting a BS 102 to handle radio resources will now be described with reference to a flowchart depicted in FIG. 6. The method comprises the following actions.

Action 601 determining whether or not there is information to be transmitted in the uplink over at least one EPS bearer.

Action 601 is an action which is already performed by UEs today. When there is information, such as data or control information that needs to be transmitted in the uplink, a Service Request procedure is initiated by the UE, and a Service Request message is transmitted towards an MME, cf. FIG. 2. The at least one EPS bearer, on or over which the information is to be transmitted could be referred to as to trigger the Service Request procedure, as previously mentioned. The at least one EPS bearer on or over which the information is to be transmitted could also be referred to as to be triggered by this information, cf. triggered to initiate a Service Request procedure.

Action 602 indicating, in a Service Request message towards an MME, which at least one EPS bearer, out of a number of EPS bearers associated with the UE, that triggered initiation of the Service Request procedure, thus enabling a BS to decide whether or not to allocate radio resources for the requested service based on a priority value associated with the at least one indicated EPS bearer.

Figure 7:
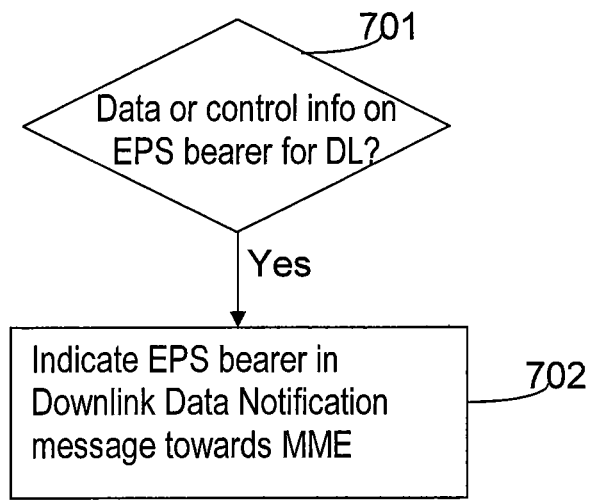
FIG. 7 illustrates a procedure in an S-GW, according to an exemplifying embodiment.

In action 602, whenever more than one bearer is associated with the UE it is not assumed that all these EPS bearers are indicated in the Service Request message towards the MME, even though this possibility is not excluded. In any case, the at least one EPS bearer which triggered initiation of the Service Request procedure, should be indicated such that it is identifiable or distinguishable from other EPS bearers associated with the UE. That is, the UE indicates the bearer(s) subject for triggering the Service Request message and procedure. The MME will then indicate this information further to the BS/eNB in an Initial Context Setup Request message Method for Serving GateWay, SGW Embodiments of the method will now be described as seen from a perspective of an SGW 105. Examples of embodiments of a method performed by an SGW 105 for assisting a BS 102 to handle radio resources will now be described with reference to a flowchart depicted in FIG. 7. The method comprises the following actions.

Action 701 determining whether or not there is information to be transmitted to a UE in the downlink over at least one EPS bearer.

Action 701 is for a network initiated Service Request procedure what action 601 is for a UE initiated Service Request procedure. This action is performed by SGWs today. When there is information to be transmitted to a UE, a Service Request procedure is initiated, and a Downlink Data Notification message is transmitted to an MME, cf. FIG. 3. As previously mentioned, the at least one EPS bearer on or over which the information is to be transmitted could be referred to as to trigger the Service Request procedure, and to be triggered by the information.

Action 702 indicating to an MME in a Downlink Data Notification message, which at least one EPS bearer, out of a number of EPS bearers associated with a UE, that triggered initiation of the Service Request procedure, thus enabling a base station, BS, to decide whether or not to allocate radio resources for the requested service based on a priority value associated with the at least one indicated EPS bearer.

Action 702 is for a network initiated Service Request procedure what action 602 is for a UE initiated Service Request procedure. As mentioned above, whenever more than one bearer is associated with the UE it is not assumed that all these EPS bearers are indicated in the Service Request message towards the MME, even though this possibility is not excluded. In any case, the at least one EPS bearer which triggered initiation of the Service Request procedure, i.e. triggered the Service Request procedure, should be indicated such that it is identifiable or distinguishable from other EPS bearers associated with the UE.

3GPP Service Request procedure

Figure 2:
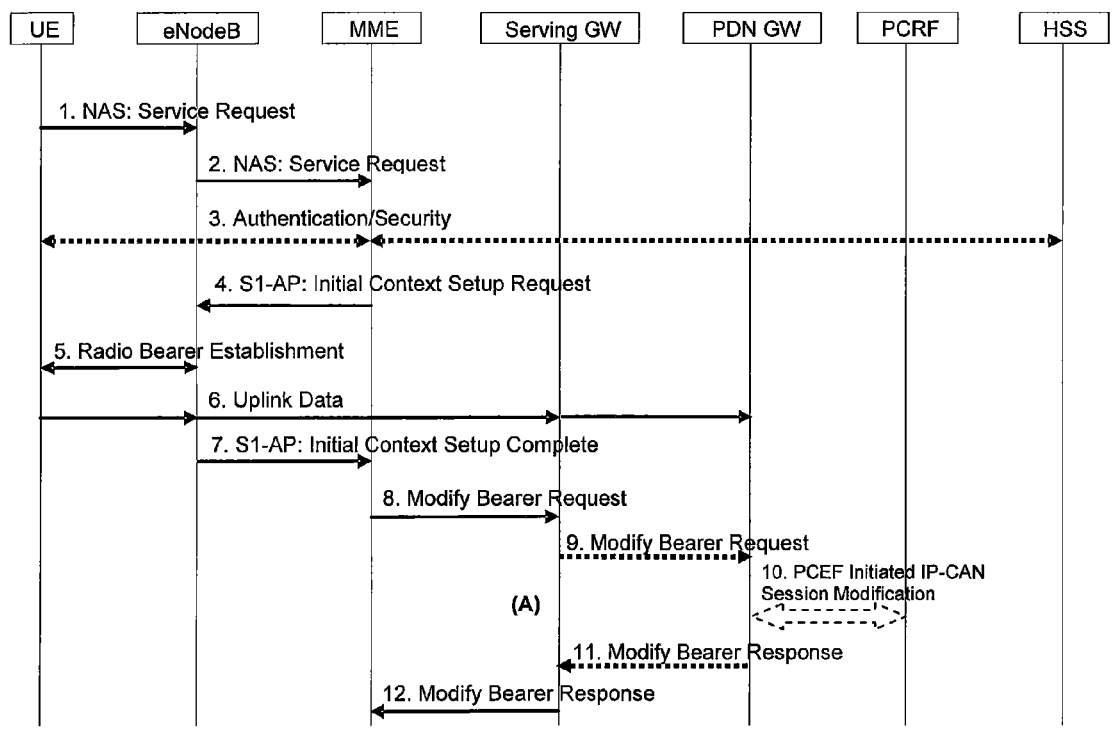
FIG. 2 is a signaling scheme illustrating a UE initiated service request in a communication network.
Figure 3:
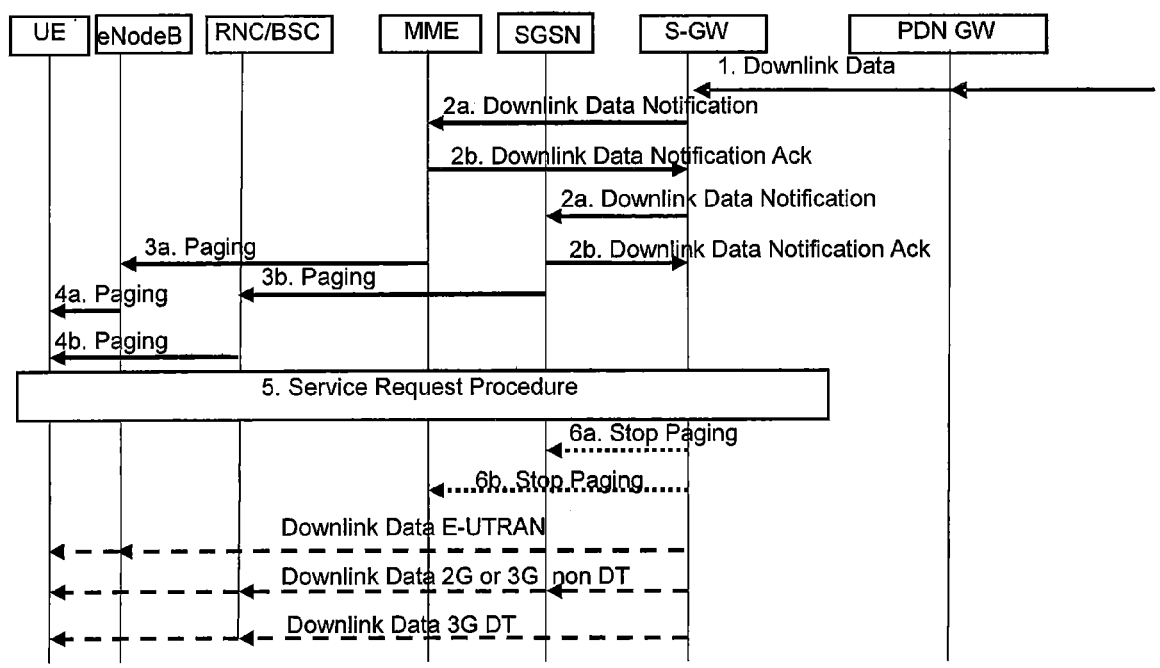
FIG. 3 is a signaling scheme illustrating a network initiated service request in a communication network.

In this section, text from 3GPP TS 23.401 is reproduced describing the service request procedures for UE initiated and network initiated service request. It is indicated by italic, bold, underlined text where the solution suggested herein introduces changes, such that more detailed information becomes available for a BS, eNB. How that new, more detailed information can be used by the eNB will be described further below. The UE initiated service request procedure is illustrated in FIG. 2, and the network initiated service request is illustrated in FIG. 3. The details and abbreviations in the standard text will not be explained herein.

3GPP TS 23.401 v12.3.0:

5.3.4 Service Request procedures 5.3.4.1 UE triggered Service Request

NOTE 1: For a PMIP-based S5/S8, procedure steps (A) are defined in TS 23.402. Steps 9 and 11 concern GTP-based S5/S8.

1. The UE sends NAS message Service Request towards the MME encapsulated in an RRC message to the eNodeB. The RRC message(s) that can be used to carry the S-TMSI and this NAS message are described in TS 36.300]. The Service Request message indicates explicit the EPS bearer(s) subject for triggering the Service Request message together with an indication if triggered due to uplink payload or a signalling message.

2. The eNodeB forwards NAS message to MME. NAS message is encapsulated in an S1-AP: Initial UE Message (NAS message, TAI+ECGI of the serving cell, S-TMSI, CSG ID, CSG access Mode). Details of this step are described in TS 36.300. If the MME can't handle the Service Request it will reject it. CSG ID is provided if the UE sends the Service Request message via a CSG cell or a hybrid cell. CSG access mode is provided if the UE sends the Service Request message via a hybrid cell. If the CSG access mode is not provided but the CSG ID is provided, the MME shall consider the cell as a CSG cell.

If a CSG ID is indicated and CSG access mode is not provided, and there is no subscription data for this CSG ID and associated PLMN or the CSG subscription is expired, the MME rejects the Service Request with an appropriate cause. The UE shall remove the CSG ID and associated PLMN of the cell where the UE has initiated the service request procedure from the Allowed CSG list, if present.

For UEs with emergency EPS bearers, i.e. at least one EPS bearer has an ARP value reserved for emergency services, if CSG access restrictions do not allow the UE to get normal services the MME shall deactivate all non-emergency bearers and accept the Service Request.

If LIPA is active for a PDN connection and if the cell accessed by the UE does not link to the L-GW where the UE initiated the LIPA PDN Connection, the MME shall not request the establishment of the bearers of the LIPA PDN connection from the eNodeB in step 4 and shall request disconnection of the LIPA PDN connection according to clause 5.10.3. If the UE has no other PDN connection then the MME shall reject the Service Request with an appropriate cause value resulting in the UE detaching, skip the following steps of the procedure and initiate the release of the core network resources with the implicit MME-initiated Detach procedure according to clause 5.3.8.3.

3. NAS authentication/security procedures as defined in clause 5.3.10 on "Security function" may be performed.

4. The MME sends S1-AP Initial Context Setup Request (Serving GW address, S1-TEID(s) (UL), EPS Bearer QoS(s), Triggered EPS Bearer(s), Security Context, MME Signalling Connection Id, Handover Restriction List, CSG Membership Indication, RAN assistance data, CN assistance data) message to the eNodeB. If there is a PDN connection established for Local IP Access, this message includes a Correlation ID for enabling the direct user plane path between the HeNB and the L-GW. If there is a PDN connection established for SIPTO at the Local Network with L-GW function collocated with the (H)eNB, this message includes a SIPTO Correlation ID for enabling the direct user plane path between the (H)eNB and the L-GW. This step activates the radio and S1 bearers for all the active EPS Bearers. Triggered EPS Bearer(s) indicates the EPS Bearer(s) for which the Service Request procedure or network initiates Service Request procedure was initiated. The eNodeB stores the Security Context, MME Signalling Connection Id, EPS Bearer QoS(s), Triggered EPS bearer(s) and S1-TEID(s) in the UE RAN context. The step is described in detail in TS 36.300. Handover Restriction List is described in clause 4.3.5.7 "Mobility Restrictions". The RAN assistance data and CN assistance data parameters are further described in TS 36.413.

NOTE 2: In this release of the 3GPP specification the Correlation ID and SIPTO Correlation ID is set equal to the user plane PDN GW TEID (GTP-based S5) or GRE key (PMIP-based S5) which is specified in clause 5.3.2.1 and clause 5.10.2.

The MME shall only request to establish Emergency EPS Bearer if the UE is not allowed to access the cell where the UE initiated the service request procedure due to CSG access restriction.

If the Service Request is performed via a hybrid cell, CSG Membership Indication indicating whether the UE is a CSG member shall be included in the S1-AP message from the MME to the RAN. Based on this information the RAN can perform differentiated treatment for CSG and non-CSG members.

5. The eNodeB performs the radio bearer establishment procedure. The user plane security is established at this step, which is described in detail in TS 36.300. When the user plane radio bearers are setup. EPS bearer state synchronization is performed between the UE and the network, i.e. the UE shall locally remove any EPS bearer for which no radio bearers are setup and, if the radio bearer for a default EPS bearer is not established, the UE shall locally deactivate all EPS bearers associated to that default EPS bearer.

6. The uplink data from the UE can now be forwarded by eNodeB to the Serving GW. The eNodeB sends the uplink data to the Serving GW address and TEID provided in the step 4. The Serving GW forwards the uplink data to the PDN GW.

7. The eNodeB sends an S1-AP message Initial Context Setup Complete (eNodeB address, List of accepted EPS bearers, List of rejected EPS bearers, S1 TEID(s) (DL)) to the MME. This step is described in detail in TS 36.300. If the Correlation ID or SIPTO Correlation ID is included in step 4, the eNodeB shall use the included information to establish a direct user plane path to the L-GW and forward uplink data for Local IP Access or SIPTO at the Local Network with L-GW function collocated with the (H)eNB accordingly.

8. The MME sends a Modify Bearer Request message (eNodeB address, S1 TEID(s) (DL) for the accepted EPS bearers, Delay Downlink Packet Notification Request, RAT Type) per PDN connection to the Serving GW. If the Serving GW supports Modify Access Bearers Request procedure and if there is no need for the Serving GW to send the signalling to the PGW, the MME may send Modify Access Bearers Request (eNodeB address(es) and TEIDs for downlink user plane for the accepted EPS bearers, Delay Downlink Packet Notification Request) per UE to the Serving GW to optimize the signalling. The Serving GW is now able to transmit downlink data towards the UE. The usage of the Delay Downlink Packet Notification Request Information Element is specified in clause 5.3.4.2 below. If the PDN GW requested UE's location and/or User CSG information and the UE's location and/or User CSG information has changed, the MME also includes the User Location Information IE and/or User CSG Information IE in this message. If ISR is activated or if the Serving Network IE has changed compared to the last reported Serving Network IE then the MME also includes the Serving Network IE in this message. If the UE Time Zone has changed compared to the last reported UE Time Zone then the MME shall include the UE Time Zone IE in this message.

If a default EPS bearer is not accepted by the eNodeB, all the EPS bearers associated to that default bearer shall be treated as non-accepted bearers. The MME releases the non-accepted bearers by triggering the bearer release procedure as specified in clause 5.4.4.2. If the Serving GW receives a DL packet for a non-accepted bearer, the Serving GW drops the DL packet and does not send a Downlink Data Notification to the MME.

9. If the RAT Type has changed compared to the last reported RAT Type or if the UE's Location and/or Info IEs and/or UE Time Zone and/or if ISR is not activated and Serving Network id are present in step 8, the Serving GW shall send the Modify Bearer Request message (RAT Type) per PDN connection to the PDN GW. User Location Information IE and/or User CSG Information IE and/or Serving Network IE and/or UE Time Zone are also included if they are present in step 8.

If the Modify Bearer Request message is not sent because of above reasons and the PDN GW charging is paused, then the SGW shall send a Modify Bearer Request message with PDN Charging Pause Stop Indication to inform the PDN GW that the charging is no longer paused. Other IEs are not included in this message.

10. If dynamic PCC is deployed, the PDN GW interacts with the PCRF to get the PCC rule(s) according to the RAT Type by means of a PCEF initiated IP-CAN Session Modification procedure as defined in TS 23.203. If dynamic PCC is not deployed, the PDN GW may apply local QoS policy.

11. The PDN GW sends the Modify Bearer Response to the Serving GW.

12. The Serving GW shall return a Modify Bearer Response (Serving GW address and TEID for uplink traffic) to the MME as a response to a Modify Bearer Request message, or a Modify Access Bearers Response (Serving GW address and TEID for uplink traffic) as a response to a Modify Access Bearers Request message. If the Serving GW cannot serve the MME Request in the Modify Access Bearers Request message without S5/S8 signalling other than to unpause charging in the PDN GW or without corresponding Gxc signalling when PMIP is used over the S5/S8 interface, it shall respond to the MME with indicating that the modifications are not limited to S1-U bearers, and the MME shall repeat its request using a Modify Bearer Request message per PDN connection.

If SIPTO at the Local Network is active for a PDN connection with stand-alone GW deployment and the Local Home Network ID for stand-alone accessed by the UE differs from the Local Home Network ID where the UE initiated the SIPTO@LN PDN Connection, the MME shall request disconnection of the SIPTO at the local network PDN connection(s) with the "reactivation requested" cause value according to clause 5.10.3. If the UE has no other PDN connection, the MME initiated "explicit detach with reattach required" procedure according to clause 5.3.8.3.

If SIPTO at the Local Network is active for a PDN connection with collocated LGW deployment and the L-GW CN address of the cell accessed by the UE differs from the L-GW CN address of the cell where the UE initiated the SIPTO at the Local Network PDN Connection, the MME shall request disconnection of the SIPTO at the local network PDN connection(s) with the "reactivation requested" cause value according to clause 5.10.3. If the UE has no other PDN connection, the MME initiated "explicit detach with reattach required" procedure according to clause 5.3.8.3.

5.3.4.3 Network Triggered Service Request

If the MME needs to signal with the UE that is in ECM-IDLE state, e.g. to perform the MME/HSS-initiated detach procedure for the ECM-IDLE mode UE or the S-GW receives control signalling (e.g. Create Bearer Request or Update Bearer Request), the MME starts network triggered service request procedure from step 3a in the Network Triggered Service request procedure.

If ISR is activated, when the Serving GW receives a Create Bearer Request or Update Bearer Request for a UE, and the S-GW does not have a downlink S1-U and the SGSN has notified the Serving GW that the UE has moved to PMM-IDLE or STANDBY state, the Serving GW buffers signalling messages and sends a Downlink Data Notification to trigger the MME and SGSN to page the UE. If the Serving GW, while waiting for the user plane to be established, is triggered to send a second Downlink Data Notification with higher priority (i.e. ARP) than the first Downlink Data Notification was sent with, the Serving GW sends a new Downlink Data Notification message indicating the higher priority to the MME. If the Serving GW receives additional downlink signalling messages for a bearer with same or lower priority than the first Downlink Data Notification was sent for or if the Serving GW has sent the second Downlink Data Notification message indicating the higher priority and receives additional downlink signalling messages for this UE, the Serving GW buffers these downlink signalling messages and does not send a new Downlink Data Notification. The S-GW will be notified about the current RAT type based on the UE triggered service request procedure. The S-GW will go on executing the dedicated bearer activation or dedicated bearer modification procedure, i.e. send the corresponding buffered signalling to MME or SGSN which UE resides in now and inform the current RAT type to the PDN GW if the RAT type has been changed compared to the last reported RAT Type. If dynamic PCC is deployed, the current RAT type information shall also be conveyed from the PDN GW to the PCRF. If the PCRF response leads to an EPS bearer modification the PDN GW should initiate a bearer update procedure as specified in clause 5.4.2.1 below.

When the Serving GW sends a Downlink Data Notification, it shall include both EPS Bearer ID and ARP. If the Downlink Data Notification is triggered by the arrival of downlink data packets at the Serving GW, the Serving GW shall include the EPS Bearer ID and ARP associated with the bearer on which the downlink data packet was received. If the Downlink Data Notification is triggered by the arrival of control signalling, the Serving GW shall include the EPS Bearer ID and ARP if present in the control signalling. If the ARP is not present in the control signalling, the Serving GW shall include the ARP in the stored EPS bearer context.

If a LIPA PDN connection exists, when the L-GW receives the downlink data for a UE that is in ECM-IDLE state, the L-GW sends the first downlink user packet to Serving GW and buffers all other downlink user packets. The Serving GW will trigger the MME to page the UE.

1. When the Serving GW receives a downlink data packet for a UE known as not user plane connected (i.e. the S-GW context data indicates no downlink user plane TEID), it buffers the downlink data packet and identifies which MME or SGSN is serving that UE.

If that MME has requested the Serving GW to throttle downlink low priority traffic and if the downlink data packet is received on a low priority bearer to be throttled (see clause 4.3.7.4.1a), the SGW drops the downlink data. The steps below are not executed.

If that MME has requested the S-GW to delay sending the Downlink Data Notification (see clause 5.3.4.2 on "Handling of abnormal conditions in UE triggered Service Request"), the Serving GW buffers the downlink data and waits until the timer expires before continuing with step 2. If the DL-TEID and eNodeB address for that UE is received before the expiry of the timer, the timer shall be cancelled and the Network triggered Service Request procedure is finished without executing the steps below, i.e. DL data are sent to the UE.

If the Serving GW receives additional downlink data packets for this UE before the expiry of the timer, the Serving GW does not restart this timer.

2. The Serving GW sends a Downlink Data Notification message to the MME and SGSN nodes for which it has control plane connectivity for the given UE. The ARP and EPS Bearer ID are always set in Downlink Data Notification. The EPS bearer(s) for which the Serving GW has received downlink packet data or a downlink control message is explicitly indicated respectively. The MME and SGSN respond to the S-GW with a Downlink Data Notification Ack message. The priority indicator, i.e. ARP is derived from the bearer triggering the Downlink Data Notification.

NOTE 1: The ARP and EPS Bearer ID are sent to the SGSN as well as MME, but the usage of these parameters at SGSN is not specified in this release of the specification.

If the Serving GW, while waiting for the user plane to be established, is triggered to send a second Downlink Data Notification for a bearer with higher priority (i.e. ARP) than the first Downlink Data Notification was sent for, the SGW sends a new Downlink Data Notification message indicating the higher priority to the MME. If the Serving GW receives additional downlink data packets for a bearer with same or lower priority than the first Downlink Data Notification was sent for or if the Serving GW has sent the second Downlink Data Notification message indicating the higher priority and receives additional downlink data packets for this UE, the Serving GW buffers these downlink data packets and the does not send a new Downlink Data Notification.

If the Tracking Area Update procedure with MME change or the Routing Area Update procedure is in progress when the old MME receives a Downlink Data Notification message, the old MME may reject a Downlink Data Notification message with an indication that the request has been temporarily rejected.

Similarly, if the Routing Area Update procedure with SGSN change or the Tracking Area Update procedure is in progress when the old SGSN receives a Downlink Data Notification message, the old SGSN may reject a Downlink Data Notification message with an indication that the request has been temporarily rejected.

Upon reception of a rejection for a Downlink Data Notification message with an indication that the request has been temporarily rejected, the Serving GW may start a locally configured guard timer and buffers all downlink user packets received to the given UE and waits for a Modify Bearer Request message to come. The Serving GW continues from the step 2 upon reception of a Modify Bearer Request message, otherwise the Serving GW releases buffered downlink user packets at expiry of the guard timer.

3a. If the UE is registered in the MME, the MME sends a Paging message (NAS ID for paging, TAI(s), UE identity based DRX index, Paging DRX length, list of CSG IDs for paging, Paging Priority indication) to each eNodeB belonging to the tracking area(s) in which the UE is registered. The step is described in detail in TS 36.300 and TS 36.413. Steps 3-4 are omitted if the MME already has a signalling connection over S1-MME towards the UE but the S1-U tunnel has not yet been established. Paging priority indication is included only if MME receives a Downlink Data Notification or Create Bearer Request with ARP associated with MPS. The ARP value for MPS is configured by operator policy. If the eNodeB during a congestion situation receives the Paging message with paging priority indication, eNodeB may perform the paging procedure with priority according to the indication.

If the MME, while waiting for a UE response to the Paging Request message sent without priority indication, receives an Update Bearer Request, Create Bearer Request or Downlink Data Notification, any of which indicates a priority associated with MPS service, the MME shall resend the paging message with paging priority.

When the MME is configured to support paging optimisation in the CN, the MME should avoid sending Paging messages to those eNodeB(s) with CSG cells for which the UE does not have a CSG subscription. When the MME is configured to support paging optimisation in the HeNB Subsystem, the list of CSG IDs for paging is included in the Paging message. For paging optimisation, the CSG IDs of expired CSG subscriptions and valid CSG subscriptions are both included in the list. If the UE has emergency bearer service the MME shall not perform the paging optimization. Paging optimization is described in clause 4.3.13.

NOTE 2: An expired CSG subscription indicates that the UE is not allowed service in the CSG. However, since the removal of the CSG from the UE is pending, it is possible the UE will camp on that CSG and therefore the UE is still paged for the CSG.

NOTE 3: The eNodeB reports to the MME the CSG ID supported. For More detail of this procedure refer to TS 36.413.

The MME may use the EPS bearer context information identified by EPS bearer ID received in Downlink Data Notification message in order to control the paging based on operator policy, such as:

paging retransmission strategies;

determining whether to send the Paging message to the eNodeBs during certain MME high load conditions;

paging optimisations for traffic arriving on the PDN connection used for Local IP Access without mobility or SIPTO at the Local Network with L-GW function collocated with the (H)eNB.

NOTE 4: The Paging priority in the Paging message is set based on ARP received in Downlink Data Notification or Create Bearer Request message.

3b. If the UE is registered in the SGSN, the SGSN sends paging messages to RNC/BSS, which is described in detail in TS 23.060.

4a. If eNodeBs receive paging messages from the MME, the UE is paged by the eNodeBs. The step is described in detail in TS 36.300 and TS 36.304.

4b. If RNC/BSS nodes receive paging messages from the SGSN the UE is paged by the RNSC/BSS, which is described in detail in TS 23.060.

5. When UE is in the ECM-IDLE state, upon reception of paging indication in E-UTRAN access, the UE initiates the UE triggered Service Request procedure (clause 5.3.4.1). If the MME already has a signalling connection over S1-MME towards the UE but the S1-U tunnel has not yet been established, then the messages sequence performed start from the step when MME establishes the bearer(s).

Upon reception of paging indication in UTRAN or GERAN access, the MS shall respond in respective access as specified TS 24.008 and the SGSN shall notify the S-GW.

The MME and/or SGSN supervises the paging procedure with a timer. If the MME and/or SGSN receives no response from the UE to the Paging Request message, it may repeat the paging. The repetition strategy is operator dependent. In the case of paging optimization described in clause 4.3.13, the paging optimization may be disabled.

If the MME and/or SGSN receives no response from the UE after this paging repetition procedure, it shall use the Downlink Data Notification Reject message to notify the Serving GW about the paging failure. In that case, if ISR is not activated, the Serving GW deletes the buffered packet(s). If ISR is activated and the Serving GW receives paging failure from both SGSN and MME, the Serving GW deletes the buffered packet(s) or rejects the control signalling which triggers the Service Request procedure. The Serving GW may invoke the procedure PGW Pause of Charging (clause 5.3.x) if UE is in ECM IDLE and the PDN GW has enabled "PDN charging pause" feature.

NOTE 5: The Serving GW may initiate the procedure PGW Pause of Charging at any time before step 5 if the UE is in ECM IDLE and the PDN GW has indicated that the feature is enabled for this PDN. See clause 5.3.6A.

6a. If ISR is activated and paging response is received in E-UTRAN access the Serving GW sends a "Stop Paging" message to the SGSN.

6b. If ISR is activated and paging response is received in UTRAN or GERAN access the Serving GW sends a "Stop Paging" message to the MME.

The Serving GW transmits downlink data towards the UE via the RAT which performed the Service Request procedure.

For a LIPA PDN connection, after the UE enters connected mode, the packets buffered in the L-GW are forwarded to the HeNB on the direct path. If the UE enters connected mode at a different cell than the one where the L-GW is collocated, the MME shall deactivate the LIPA PDN connection as defined in clause 5.3.4.1 step 2.

If the network triggered service request fails due to no response from the UE, then MME and/or SGSN may based on operator policy initiate the Dedicated Bearer Deactivation procedure for preserved GBR bearers. For details, see clause 5.4.4.2 for MME and TS 23.060 for SGSN.

Embodiments of Nodes

Below, implementations of the nodes: a BS, an MME, a UE and an SGW will be described with reference to FIGS.

8-15. The nodes are configured to perform at least a respective one of the methods described above with reference to FIGS. 4-7. The nodes will be described in brief in order to avoid unnecessary repetition.

Base Station, BS

Embodiments described herein also relate to a base station such as an eNB, operable in a wireless communication system. The base station is configured to perform at least one embodiment of the method in a base station described above. The base station is associated with the same technical features, objects and advantages as the method described above and illustrated e.g. in FIG. 4.

Figure 8:
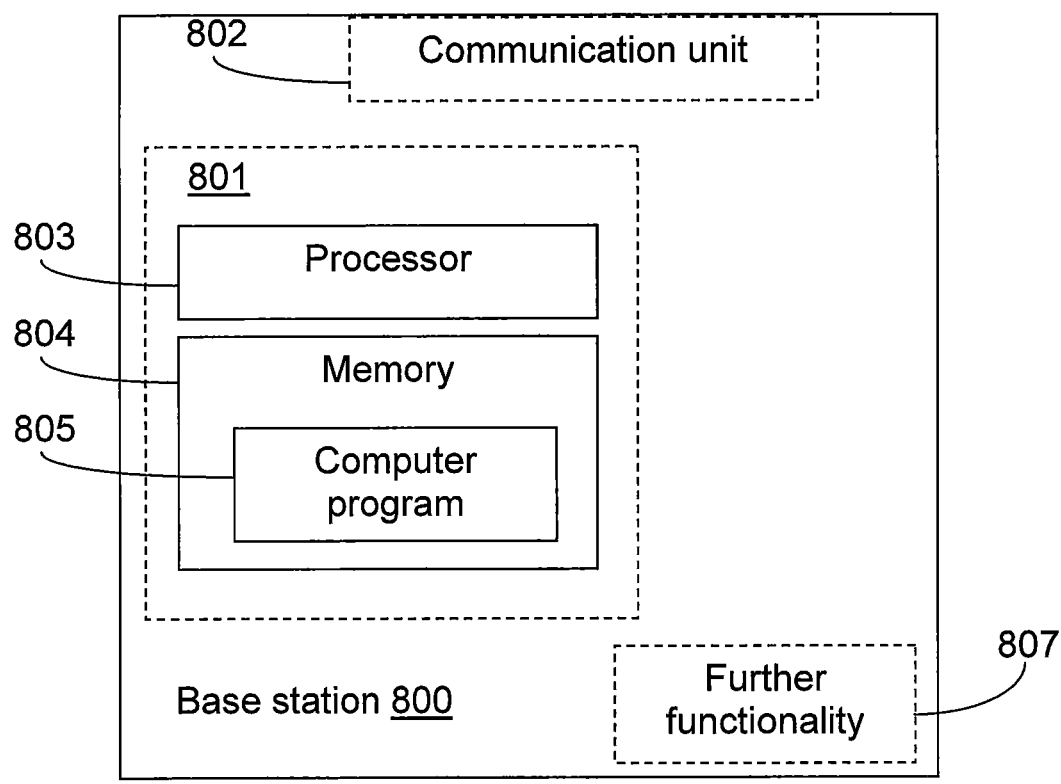
FIGS. 8 and 9 show a BS according to exemplifying embodiments.

Below, an exemplifying base station 800, adapted to enable the performance of an above described method for handling radio resources will be described with reference to FIG. 8. The base station is operable in a wireless communication network and can thus be assumed to be operable e.g. to serve UEs and to communicate with core network nodes. The part of the base station which is most affected by the adaptation to the herein described method is illustrated as an arrangement 801, surrounded by a dashed line. The base station 800 and arrangement 801 are further illustrated as to communicate with other entities via a communication unit 802 comprising means for wireless communication and possibly means for wired communication. The base station or arrangement may be assumed to comprise other functional units 807, for carrying out regular base station functions.

The arrangement part of the base station may be implemented and/or described as follows:

The arrangement comprises processing means 803, such as a processor, and a memory 804 for storing instructions 805, the memory comprising instructions which when executed by the processing means causes the base station or arrangement to receive, from an MME, an Initial Context Setup message as part of a Service Request procedure, said Initial Context Setup message comprising information indicating which at least one EPS, bearer, out of a number of EPS bearers associated with a UE, that has triggered initiation of the Service Request procedure. The execution of the instructions further causes the base station to decide or determine whether or not to allocate radio resources for the requested service based on a priority value associated with the at least one indicated EPS bearer; and further to allocate radio resources for the requested service in accordance with the decision.

Figure 9:
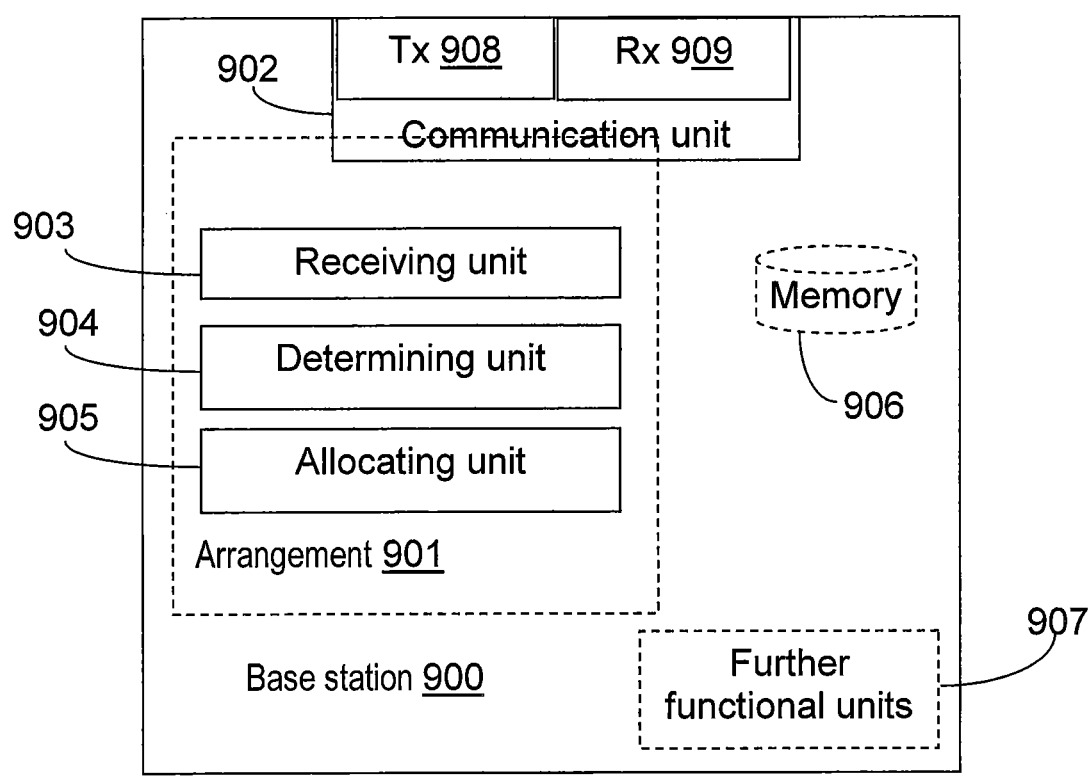

An alternative embodiment of the base station 800 is shown in FIG. 9. FIG. 9 illustrates a base station 900, operable in a wireless communication network.

The base station 900 comprises a receiving unit 903, configured to receive, from an MME, an Initial Context Setup message as part of a Service Request procedure, said Initial Context Setup message comprising information indicating which at least one EPS bearer, out of a number of EPS bearers associated with a UE, that has triggered initiation of the Service Request procedure.

The base station 900 further comprises a deciding unit 904, configured to decide whether or not to allocate radio resources for the requested service based on a priority value associated with the at least one indicated EPS bearer. The base station further comprises an allocating unit 905, configured to allocate radio resources for the requested service in accordance with the decision.

Mobility Management Entity, MME

Embodiments described herein also relate to an MME, operable in a wireless communication system. The MME is configured to perform at least one embodiment of the method in an MME described above. The MME is associated with the same technical features, objects and advantages as the method described above and illustrated e.g. in FIG. 5.

Figure 10:
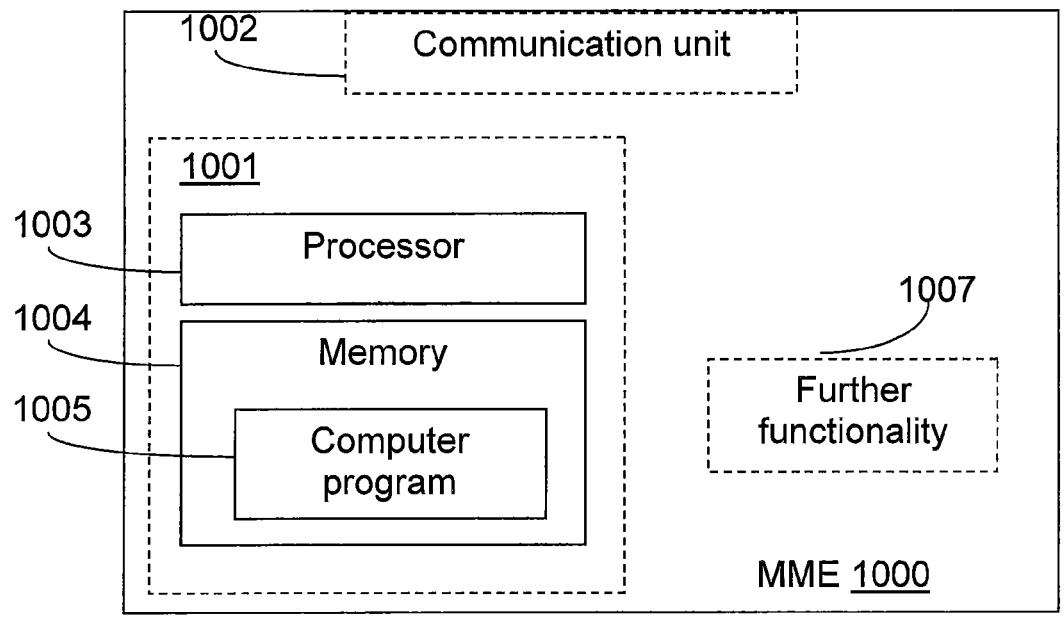
FIGS. 10 and 11 show an MME according to exemplifying embodiments.

Below, an exemplifying MME 1000, adapted to enable the performance of an above described method for handling radio resources will be described with reference to FIG. 10. The MME is operable in a wireless communication network. The part of the MME which is most affected by the adaptation to the herein described method is illustrated as an arrangement 1001, surrounded by a dashed line. The MME 1000 and arrangement 1001 are further illustrated as to communicate with other entities, such as base stations and SGWs via a communication unit 1002 comprising means for wired communication and possibly means for wireless communication. The MME or arrangement may be assumed to comprise other functional units 1007, for carrying out regular MME functions.

The arrangement part of the MME may be implemented and/or described as follows:

The arrangement comprises processing means 1003, such as a processor, and a memory 1004 for storing instructions 1005, the memory comprising instructions which when executed by the processing means causes the MME or arrangement to, as part of a Service Request procedure, indicate, in an Initial Context Setup Request towards a base station, which at least one EPS bearer, out of a number of EPS bearers associated with a UE, that triggered initiation of the Service Request procedure, thus enabling the base station to decide whether or not to allocate radio resources for the requested service based on a priority value associated with the at least one indicated EPS bearer. The execution of the instructions may further cause the MME to, when the Service Request is network initiated, receive, from an SGW, a Downlink Data Notification message, indicating which at least one EPS bearer, out of a number of EPS bearers associated with a UE, that triggered initiation of the Service Request procedure, thus enabling the indicating of this information in the Initial Context Setup Request towards the base station. The execution of the instructions may further cause the MME to, when the Service Request is UE initiated, receive, from a UE, a Service Request message indicating which at least one EPS bearer, out of a number of EPS bearers associated with the UE, that triggered initiation of the Service Request procedure, thus enabling the indicating of this information in the Initial Context Setup Request towards the BS.

Figure 11:
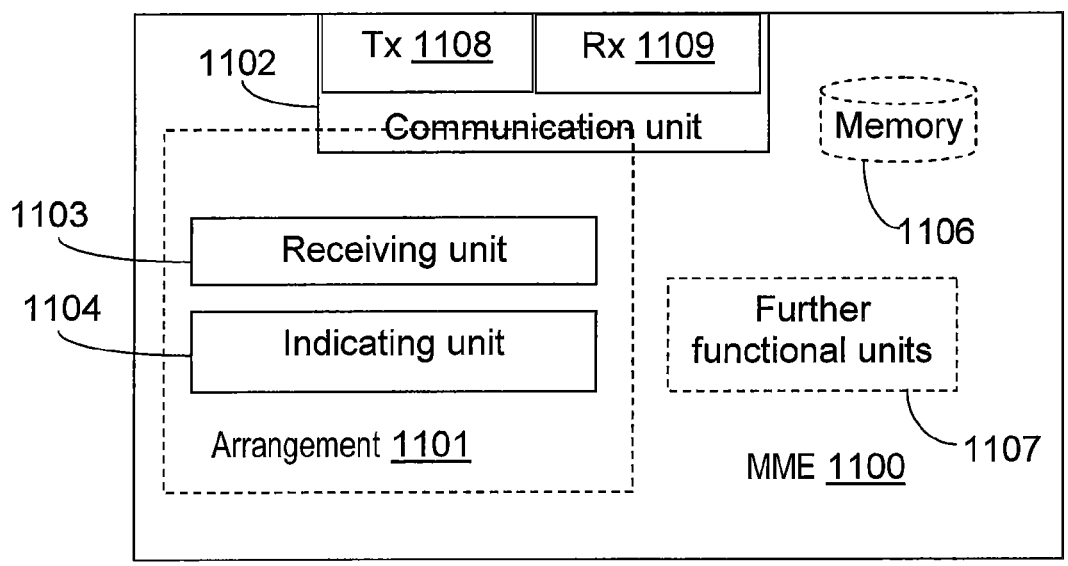

An alternative embodiment of the MME 1000 is shown in FIG. 11. FIG. 11 illustrates an MME 1100, operable in a wireless communication network.

The MME 1100 comprises a receiving unit 1003, configured to receive, from an SGW, in case of a network initiated Service Request procedure, a Downlink Data Notification message, indicating which at least one EPS bearer, out of a number of EPS bearers associated with a UE, that triggered initiation of the Service Request procedure. The receiving unit 1003, is further configured to receive, from a UE, in case of a UE initiated Service Request procedure, a Service Request message indicating which at least one EPS bearer, out of a number of EPS bearers associated with the UE, that triggered initiation of the Service Request procedure.

The MME 1100 further comprises an indicating unit 1104, configured to as part of a Service Request procedure, indicate, in an Initial Context Setup Request towards a base station, which at least one EPS bearer, out of a number of EPS bearers associated with a UE, that triggered initiation of the Service Request procedure.

User Equipment, UE

Embodiments described herein also relate to a UE, operable in a wireless communication system. The UE is configured to perform at least one embodiment of the method in UE described above. The UE is associated with the same technical features, objects and advantages as the method described above and illustrated e.g. in FIG. 6.

Figure 12:
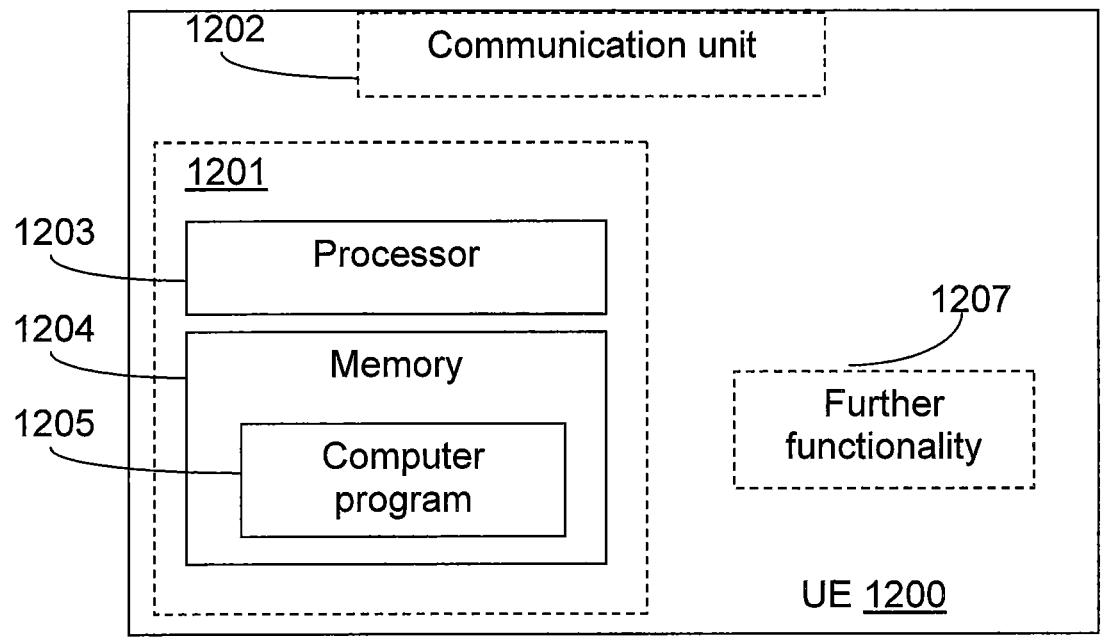
FIGS. 12 and 13 show a UE according to exemplifying embodiments.

Below, an exemplifying UE 1200, adapted to enable the performance of an above described method for handling radio resources will be described with reference to FIG. 12. The UE is operable in a wireless communication network. The part of the UE which is most affected by the adaptation to the herein described method is illustrated as an arrangement 1201, surrounded by a dashed line. The UE 1200 and arrangement 1201 are further illustrated as to communicate with other entities, such as base stations, via a communication unit 1202 comprising means for wireless communication. The UE or arrangement may be assumed to comprise other functional units 1207, for carrying out regular UE functions.

The arrangement part of the UE may be implemented and/or described as follows:
The arrangement comprises processing means 1203, such as a processor, and a memory 1204 for storing instructions 1205, the memory comprising instructions which when executed by the processing means causes the UE or arrangement to, as part of a UE initiated Service Request procedure, indicate, in a Service Request message towards an MME, which at least one EPS bearer, out of a number of EPS bearers associated with the UE, that triggered initiation of the Service Request procedure, thus enabling a base station, BS, to decide whether or not to allocate radio resources for the requested service based on a priority value associated with the at least one indicated EPS bearer.

Figure 13:
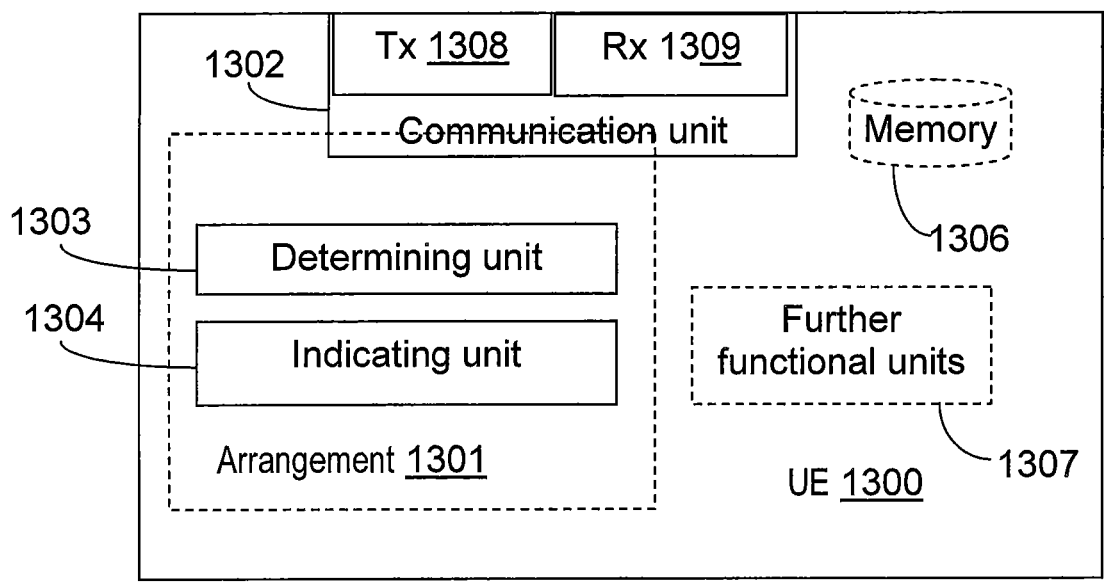

An alternative embodiment of the UE 1200 is shown in FIG. 13. FIG. 13 illustrates a UE 1300, operable in a wireless communication network. The UE 1300 is illustrated as to comprise a determining unit 1303, configured to determine whether or not there is information to be transmitted in the uplink over at least one EPS bearer. This functionality is, however, part of the prior art, and may therefore be considered to be an implicit part of the UE.

The UE 1100 further comprises an indicating unit 1104, configured to as part of a UE initiated Service Request procedure, indicate, in a Service Request message towards an MME, which at least one Evolved Packet System, EPS, bearer, out of a number of EPS bearers associated with the UE, that triggered initiation of the Service Request procedure.

Serving Gateway, SGW

Embodiments described herein also relate to an SGW, operable in a wireless communication system. The SGW is configured to perform at least one embodiment of the method in an SGW described above. The SGW is associated with the same technical features, objects and advantages as the method described above and illustrated e.g. in FIG. 7.

Figure 14:
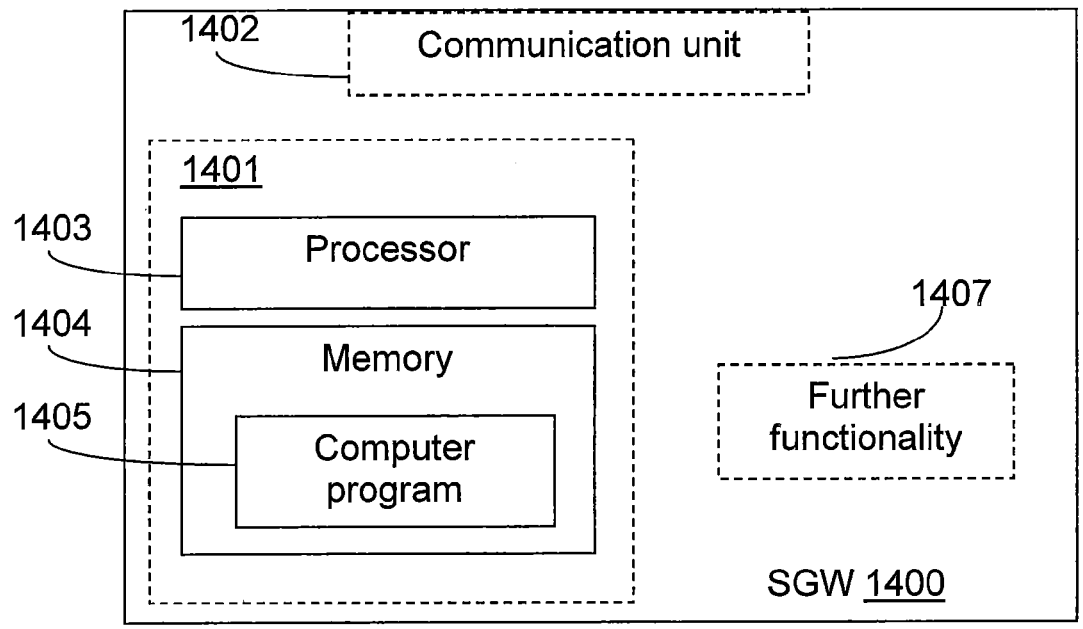
FIGS. 14 and 15 show an S-GW according to exemplifying embodiments.

Below, an exemplifying SGW 1400, adapted to enable the performance of an above described method for handling radio resources will be described with reference to FIG. 14. The SGW is operable in a wireless communication network. The part of the SGW which is most affected by the adaptation to the herein described method is illustrated as an arrangement 1401, surrounded by a dashed line. The SGW 1400 and arrangement 1401 are further illustrated as to communicate with other entities, such as MMEs, via a communication unit 1402 comprising means for wired communication and possibly means for wireless communication. The SGW or arrangement may be assumed to comprise other functional units 1407, for carrying out regular SGW functions.

The arrangement part of the SGW may be implemented and/or described as follows:
The arrangement comprises processing means 1403, such as a processor, and a memory 1404 for storing instructions, the memory comprising instructions 1405 which when executed by the processing means causes the SGW or arrangement to, as part of a network initiated Service Request procedure, indicate, in a Service Request message towards an MME, which at least one EPS bearer, out of a number of EPS bearers associated with a UE, that triggered initiation of the Service Request procedure, thus enabling a base station, BS, to decide whether or not to allocate radio resources for the requested service based on a priority value associated with the at least one indicated EPS bearer.

Figure 15:
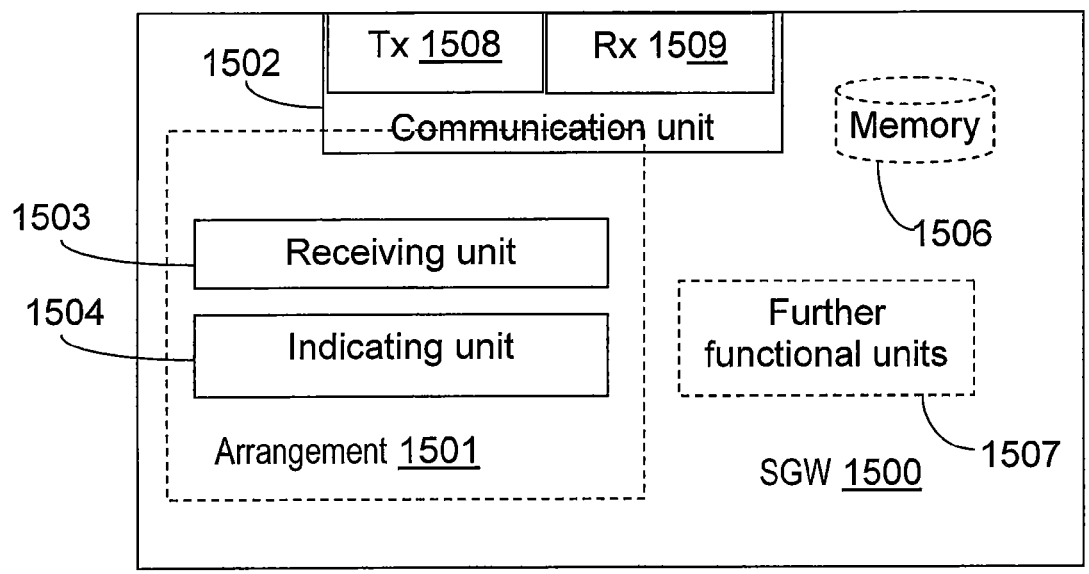

An alternative embodiment of the SGW 1400 is shown in FIG. 15. FIG. 15 illustrates an SGW 1500, operable in a wireless communication network.

The SGW 1500 is illustrated as to comprise a determining unit 1503, configured to determine whether or not there is information to be transmitted in the uplink over at least one EPS bearer. This functionality is, however, part of the prior art, and may therefore be considered to be an implicit part of the SGW.

The SGW 1500 further comprises an indicating unit 1504, configured to, as part of a network initiated Service Request procedure, indicate, in a Service Request message towards an MME, which at least one Evolved Packet System, EPS, bearer, out of a number of EPS bearers associated with the SGW, that triggered initiation of the Service Request procedure.

The units or modules in the arrangements in the different nodes described above could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIGS. 4-7. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

When using the word "comprise" or "comprising" it shall be interpreted as non-limiting, i.e. meaning "consist at least of". Nouns with and "(s)" at the end, such as e.g. "bearer(s)", should be interpreted as "one or more", i.e. for the example with bearer(s): "at least one bearer", or "one or more bearers". The expression "priority value" used herein could alternatively be exchanged for "priority".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for handling radio resources performed by a base station, in a wireless communication network, the method comprising:
receiving, from a Mobility Management Entity (MME) an Initial Context Setup message as part of a Service Request procedure, said Initial Context Setup message comprising information for a plurality of Evolved Packet System (EPS) bearers and an indication of which at least one EPS bearer of the plurality of EPS bearers triggered an initiation of the Service Request procedure;
deciding whether or not to allocate radio resources for the requested service based on a priority value associated with the at least one EPS bearer indicated by the indication; and
allocating radio resources for the requested service in accordance with the deciding.

2. The method according to claim 1, wherein the deciding is based on the priority value indicating a highest priority is associated with the at least one EPS bearer indicated by the indication.

3. A method for handling radio resources performed by a Mobility Management Entity, MME, operable in a wireless communication system, the method comprising:
indicating, in an Initial Context Setup Request transmitted toward a Base Station, BS, a plurality of Evolved Packet System (EPS) bearers and an identifier of at least one EPS bearer of the plurality of EPS bearers triggered an initiation of a Service Request procedure, wherein the EPS bearer identified by the identifier is associated with a priority value used in a determination as to whether to allocate radio resources to a requested service.

4. The method according to claim 3,
wherein the Service Request is initiated by a node of the wireless communication system other than a user equipment (UE), the method further comprising:
receiving, from a Serving GateWay a Downlink Data Notification message comprising information identifying the at least one EPS bearer of the plurality of EPS bearers that triggered initiation of the Service Request procedure, wherein the indicating in the Initial Context Setup Request comprises indicating the information in the Initial Context Setup Request.

5. The method according to claim 3,
wherein the Service Request is initiated by a user equipment (UE), the method further comprising:
receiving, from the UE, a Service Request message comprising information indicating the at least one EPS bearer of the plurality of EPS bearers that triggered initiation of the Service Request procedure, wherein the indicating in the Initial Context Setup Request comprises indicating the information in the Initial Context Setup Request.

6. A method for handling radio resources performed by a User Equipment (UE) operable in a wireless communication system, the method comprising:
as part of a Service Request procedure initiated by the UE, transmitting a Service Request message towards a Mobility Management Entity (MME), comprising information identifying a plurality of Evolved Packet System (EPS) bearers associated with the UE, and an indication of at least one EPS bearer in the plurality of EPS bearers that triggered initiation of the Service Request procedure, wherein the at least one EPS bearer that triggered initiation of the Service Request procedure are each associated with a priority value, and wherein a base station (BS) is configured to decide whether to allocate radio resources for the requested service based on the priority value associated with each of the at least one EPS bearers.

7. A method for handling radio resources performed by a Serving GateWay operable in a wireless communication system, the method comprising:
as part of a Service Request procedure initiated by a node of the wireless communication system:
transmitting, to a Mobility Management Entity a Downlink Data Notification message comprising information identifying a plurality of Evolved Packet System (EPS) bearers and an indicator of which at least one EPS bearer of the plurality of EPS bearers triggered an initiation of the Service Request procedure, wherein the at least one EPS bearer is associated with a priority value used by a base station to decide whether or not to allocate radio resources to a requested service.

8. A base station (BS) comprising at least one processor and memory, wherein the BS is operable in a wireless communication network, and wherein the memory stores instructions that, when executed by the at least one processor, cause the at least one processor to:
receive an Initial Context Setup message as part of a Service Request procedure, wherein the Initial Context Setup message comprises information identifying a plurality of Evolved Packet System (EPS) bearers and an indication of which at least one EPS bearer of the plurality of EPS bearers triggered an initiation of the Service Request procedure;
decide whether or not to allocate radio resources for a requested service based on a priority value associated with the at least one EPS bearer, resulting in a decision; and
allocate radio resources for the requested service in accordance with the decision.

9. The base station according to claim 8, wherein the decision is based on the priority value indicating a highest priority is associated with the at least one EPS bearer.

10. A Mobility Management Entity (MME) comprising at least one processor and memory, wherein the MME is operable in a wireless communication system, and wherein the memory stores instructions that, when executed by the at least one processor, cause the processor to:
as part of a Service Request procedure,
transmit an Initial Context Setup Request towards a Base Station (BS), wherein the Initial Context Setup Request comprises identifiers for a plurality of Evolved Packet System (EPS) bearers and an indication of which at least one EPS bearer of the plurality of EPS bearers triggered an initiation of the Service Request procedure, wherein the at least one EPS bearer is associated with a priority value used by the BS to decide whether or not to allocate radio resources for a requested service.

11. The MME according to claim 10, the memory storing further instructions that, when executed by the processor, cause the processor to:

when the Service Request is initiated by a node of the wireless communication system other than a User Equipment (UE):
receive, from a Serving GateWay (SGW) a Downlink Data Notification message, indicating the at least one EPS bearer that triggered the initiation of the Service Request procedure, wherein transmitting the Initial Context Setup Request comprises transmitting information from the Downlink Data Notification message in the Initial Context Setup Request.

12. The MME according to claim 10, being further configured to:
when the Service Request is initiated by a user equipment (UE):
receive, from the UE, a Service Request message indicating which the at least one EPS bearer, that triggered the initiation of the Service Request procedure, wherein transmitting the Initial Context Setup Request comprises transmitting information from the Service Request in the Initial Context Setup Request.

13. A User Equipment (UE) operable in a wireless communication system comprising at least one processor and memory storing instructions that, when executed by the at least one processor, cause the at least one processor to:
transmit a Service Request message towards a Mobility Management Entity (MME), wherein the Service Request message comprises information identifying a plurality of Evolved Packet System (EPS) bearers and an indication of which at least one EPS bearer of the plurality of EPS bearers triggered an initiation of a Service Request procedure, thus enabling a base station to decide whether or not to allocate radio resources for the requested service based on a priority value associated with the at least one EPS bearer.

14. A Serving GateWay (SGW) operable in a wireless communication system; the SGW comprising at least one processor and memory storing instructions that, when executed by the at least one processor, cause the at least one processor to:
as part of a Service Request procedure initiated by a node of the wireless communication system:
transmit to a Mobility Management Entity (MME) a Downlink Data Notification message comprising information identifying a plurality of Evolved Packet System (EPS) bearers and an indication of at least one EPS bearer out of the plurality of EPS bearers that triggered initiation of the Service Request procedure, wherein the at least one EPS bearer that triggered initiation of the Service Request procedure is associated with a priority value used by a base station to decide whether or not to allocate radio resources for a requested service.

* * * * *